Feb. 10, 1942. A. A. PETERS Re. 22,022

COFFEE-MAKING DEVICE

Original Filed March 7, 1938 2 Sheets-Sheet 1

INVENTOR.
A. A. PETERS
BY
ATTORNEY.

Feb. 10, 1942. A. A. PETERS Re. 22,022
COFFEE-MAKING DEVICE
Original Filed March 7, 1938 2 Sheets-Sheet 2
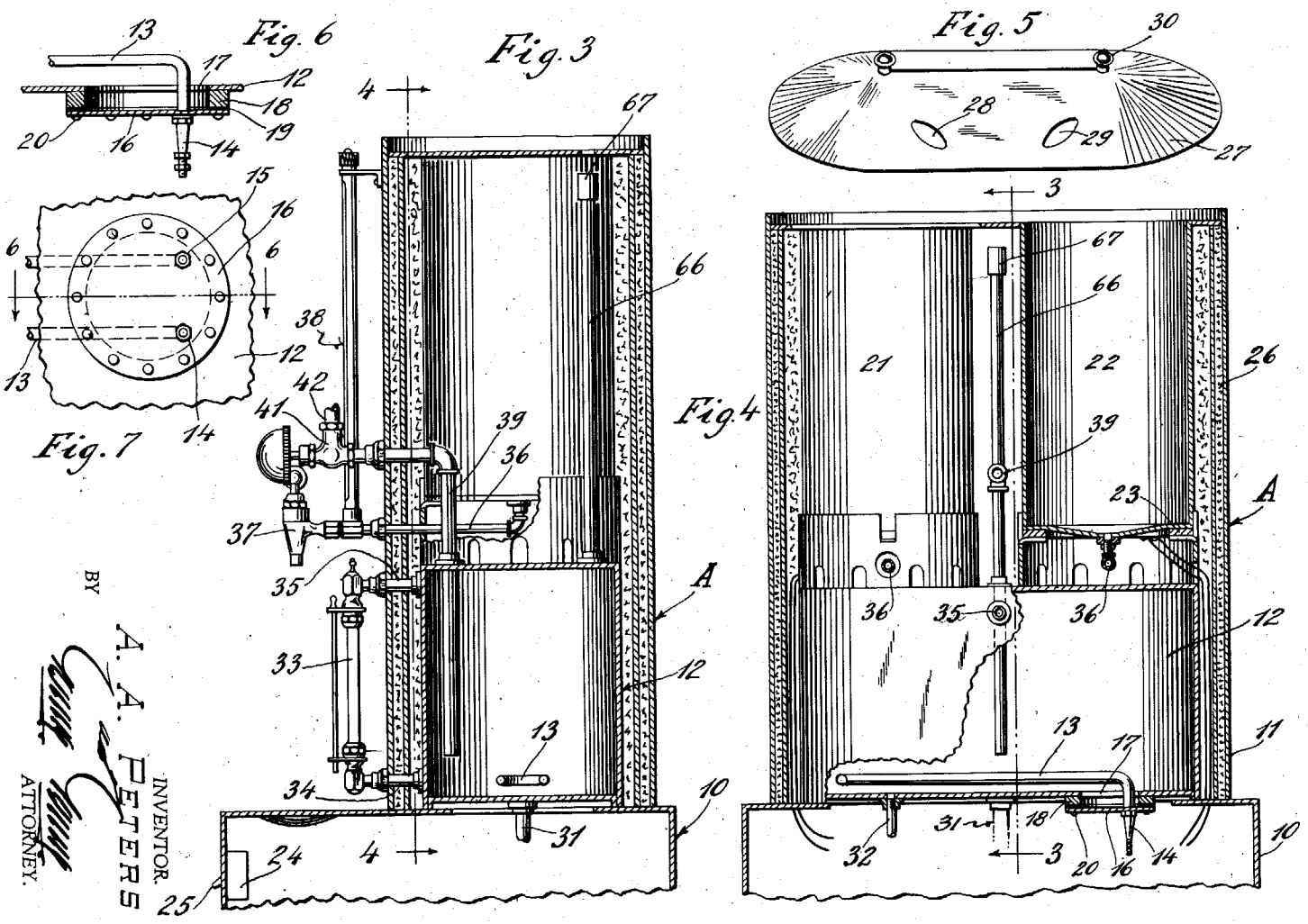
INVENTOR.
A. A. PETERS
BY
ATTORNEY.

Reissued Feb. 10, 1942

Re. 22,022

UNITED STATES PATENT OFFICE 22,022

COFFEE-MAKING DEVICE

Ambrose A. Peters, Milwaukee, Wis.

Original No. 2,190,270, dated February 13, 1940, Serial No. 194,405, March 7, 1938. Application for reissue December 10, 1941, Serial No. 422,457

5 Claims. (Cl. 53—3)

This invention appertains to coffee-making devices, and has for one of its primary objects the provision of a novel coffee urn for restaurants and the like, in which the obtaining of a uniform, clear infusion of coffee at all times is assured without sediment and objectionable ingredients.

Another object of my invention is the provision of a coffee-making device embodying a container for the ground or pulverized coffee beans, with means for forcing hot water under pressure up through the ground coffee into a suitable dispensing vessel, the device eliminating the customary procedure of water gravitating down through the ground coffee, which allows hot water to stay in contact with the ground coffee too long a period of time, and which results in the water taking up objectionable constituents of the ground coffee.

A further object of my invention is to provide a coffee urn embodying a closed boiler for receiving a predetermined quantity of clear water, and a container for receiving a predetermined quantity of ground coffee, whereby a uniform grade of coffee can be obtained at all times without likelihood of error.

A further object of my invention is the provision of novel means for forming the container for the ground coffee, and novel means for associating the same with the urn, whereby the container can be readily and quickly placed for delivering made coffee to any desired selected dispensing tank.

A further salient object of my invention is the provision of a container for the ground coffee, with novel means for forcing hot water up under pressure through the coffee, the container having novel means for filtering the liquid as the same leaves the container so as to insure the quick passage of the water through the container without sediment.

A further object of my invention is the provision of novel means for detachably associating the container with the coffee urn, whereby the same can be quickly and expeditiously re-charged with the desired measured quantity of coffee.

A still further object of my invention is to provide an improved coffee urn of the above character, which will be durable and efficient in use, one that will be simple and easy to manufacture, and one which can be placed upon the market at a reasonable cost.

With these and other objects in view, the invention consists in the novel construction, arrangement, and formation of parts, as will be herein after more specifically described, claimed, and illustrated in the accompanying drawings, in which drawings—

Figure 1 is a perspective view of my improved coffee-making device or urn.

Figure 2 an an enlarged side elevation of the container for the ground coffee, with parts thereof broken away and in section, illustrating the means for detachably and rotatably connecting the container with the urn.

Figure 3 is a transverse section through the urn taken substantially on the line 3—3 of Figure 4, looking in the direction of the arrows.

Figure 4 is a longitudinal section through the urn, taken substantially on the line 4—4 of Figure 3, looking in the direction of the arrows.

Figure 5 is a detail perspective view of the cover for the urn.

Figure 6 is an enlarged detail sectional view illustrating the means of associating the electric heating element with the closed boiler, the view being taken substantially on the line 6—6 of Figure 7.

Figure 7 is an enlarged fragmentary bottom plan view of the closed boiler, illustrating the means of detachably associating the electric heating element therewith.

Figure 1:
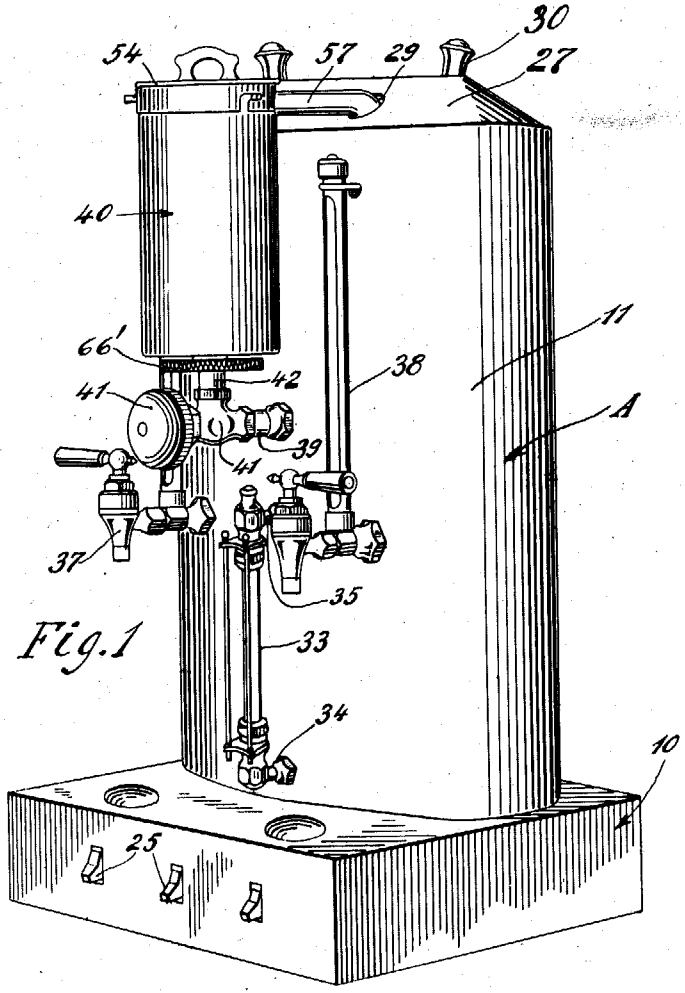
Figure 2:
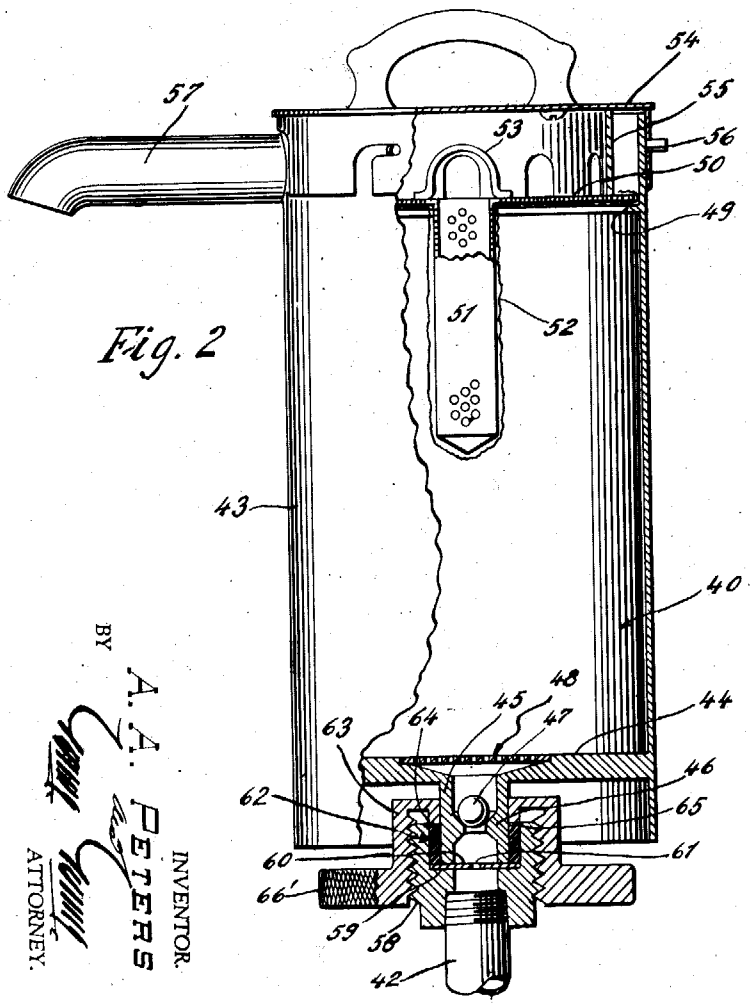

Referring to the drawings in detail, wherein similar reference characters designate corresponding parts throughout the several views, the letter A generally indicates my improved coffee-making device or urn, which comprises a hollow base 10, preferably formed of sheet metal suitably treated to present a pleasing appearance. Arranged on the base 10 is an upright protecting housing or casing 11, which receives the closed boiler 12 for the clear water. The boiler 12 rests upon the base 10, and is adapted to be heated by any desired means, such as a gas burner, or the like.

It is preferred, however, to heat the boiler by an electric resistance element 13 of the submerged type. The element 13 is of an elongated character substantially U-shaped in plan, and the ends of the legs thereof carry depending terminals 14 and 15, which are rigidly secured to a cover plate 16. This cover plate 16 closes the opening 17 formed in the bottom wall of the boiler 12, which is formed to receive the resistance element. The opening 17 is surrounded by a reinforcing rib 18, and a gasket 19 can be interposed between the cover plate and the rib to prevent seepage of liquid between the same. Suitable bolts or the like 20 can be employed for holding the cover plate in position. The element 13 is introduced into the boiler through the opening 17 at an angle, and is then swung into its correct position with the cover plate 16 in abutting relation to the flange or rib 18, after which the cover plate is rigidly secured in place, as described.

Arranged within the housing or casing 11 on top of the closed boiler 12 on each side of its transverse center are storage and dispensing tanks 21 and 22, which are adapted to receive the made coffee, as will be later set forth. The finished coffee in the tanks 21 and 22 is kept warm by the heat rising from the boiler 12, and if so desired electric heating elements 23 can be provided for each tank so as to maintain coffee at the desired temperature. The front wall of the base 10 carries a switch box 24 for the heating element 13 and the heating elements 23, and the switch levers 25 for these elements extend through the front wall, whereby the flow of current can be ready controlled by an operator.

The casing or housing 11 is also preferably treated to enhance the appearance thereof, and can be insulated in any desired manner, such as is indicated by the reference character 26 for retaining heat therein. The top of the housing or casing can be closed by removable cover 27, and it is to be noted at this point that the upper ends of the tanks 21 and 22 are left open and that the cover is provided respectively with openings 28 and 29 to permit the introduction of the made coffee into the storage and dispensing tanks.

Any desired type of handle 30 can be provided for the removal cover 27.

Connected with the lower end of the boiler 12 is a pipe 31 for permitting the introduction of water into the boiler from a service main, or the like, and a hand-operated valve (not shown) can be incorporated in the length of the pipe for controlling the flow of water therethrough. If preferred, a drain pipe 32 can communicate with the lower end of the boiler for facilitating the draining of water therefrom when it is desired to wash the boiler. The boiler is also provided with a sight glass 33, so that the operator can readily determine the height of the water in the boiler. This sight glass is arranged exteriorly of the housing or casing 11, and has communication with the upper and lower ends of the boiler through the medium of short pipes 34 and 35.

Extending from the lower ends of the storage and dispensing tanks 21 and 22 are outlet or draw-off pipes 36, and these outlet pipes also extend through the front wall of the housing, and have connected therewith dispensing faucets 37. Sight glasses 38 can be connected with the pipes 36, so that the height of the coffee in the tanks can be readily seen.

Leading from the closed boiler 12 is a pressure pipe 39, and this pipe likewise leads out through the front wall of the housing or casing 11, and is adapted to supply hot water under pressure to the ground coffee container 40, which forms one of the salient features of my invention, and which will be later described in detail. The outer end of the pressure pipe 39 supports a control valve 41, the outlet end of which communicates with a vertically disposed tube 42, which forms the support for the container 40. It is to be noted that the lower end of the pressure pipe 39 terminates short of the lower end of the boiler, and above the electric resistance element 13. This prevents water from being drawn from the boiler below the top face of the element 13, and thus the overheating of the element, and the burning out thereof, is prevented. The position of the pipe 39 also controls the quantity of clear water which is forced through the container 40.

Referring to the ground coffee container 40, it will be noted that the same includes a cylindrical side wall 43, and a bottom wall 44, which has axially formed thereon a depending nipple 45. This nipple 45 is provided with an interior seat 46 for the ball valve 47. A strainer plate 48 is detachably associated with the bottom wall 44 above the nipple for forming a support for the ground coffee to prevent the dropping of the ground coffee into the nipple. An interior annular flange 49 is formed on the side wall of the container adjacent to the upper end thereof for supporting the perforated filter plate 50. This filter plate 50 supports at its axial center a depending perforated filter tube 51, which is adapted to extend down into the ground coffee. The filter plate 50, and the tube 51, are covered by a removable filtering fabric 52, which can be made from any desired material, and this filtering fabric can be held in place by a draw-string, or the like. A handle 53 is connected with the filter plate so as to facilitate the removal thereof from the container. A removable cover 54 is provided for the top of the container so as to facilitate the introduction of the ground coffee therein, and this cover can be provided with a depending collar 55 for engaging the filter plate 50 to hold the same in proper position on its supporting flange 49. The cover 54 can be locked in position on the container in any desired manner, such as through the medium of a bayonet slot and pin connection 56.

Extending radially from the container 40 above the filter plate 50 is a discharge nozzle 57 for the made coffee, and this discharge nozzle 57 is adapted to be swung into either of the openings 28 or 29, so as to allow the flow of made coffee into the desired tank 21 or 22.

As heretofore intimated, the container 40 is associated with the urn in a novel manner, and thus the upper end of the supporting pipe 42 for the container receives an externally threaded collar 58. The collar 58 has formed therein an interior shoulder 59 on which rests a control disc 60, having a relatively small axial aperture 61, through which the hot water from the pipe 42 is adapted to flow into the container. The opening 61 is formed relatively small so that a sudden rush of water from the boiler into the container will be prevented, and the disc forms means for controlling the flow of water into the container without the minute adjustment of the valve 41. Seated on the disc 60 is a rubber or like gasket 62, and the nipple 45 of the container is received in the collar and engages the inner face of the gasket. A hand nut 63 is threaded on the coarse threads of the collar 58, and this hand nut carries a depending annular flange 64, which is adapted to ride between the nipple 45 and the collar 58 for engagement with the gasket 62. If preferred, a wear ring 65 can be interposed between the flange 64 and the gasket 62. The hand nut 63 can carry any preferred type of hand wheel 66 to facilitate the turning thereof. Obviously, when the nut 63 is tightened, the flange 64 will be forced down against the gasket 62 so as to expand the same into intimate contact with the nipple 45, which will hold the nipple in place.

When it is desired to remove the container, or change the container on the collar 58, the hand nut is loosened, which reduces the grip of the gasket on the nipple, and allows easy movement of the nipple.

In use of my improved device, water is introduced into the boiler 12 through the pipe 31, and the height thereof is observed from the glass 33. When the water reaches the desired height, the same is shut off and the water is then heated by the resistance element 13. When sufficient pressure is obtained in the boiler, the water will be forced therefrom, up through the pipe 39, through the supporting pipe 42, and into the container 40. The pressure of the water will lift the valve 47 from off of its seat 46, and thus the free upward flow of the water is unhampered. The pressure will force the water up through the ground coffee in the container, and initially the made coffee will flow into the bottom of the filter tube 51. As sediment collects on the bottom of the filter cloth around the tube, the liquid will flow into the upper end of the filtering tube and through the filter plate 50. The container is positioned so as to dispose the discharge nozzle 57 over the desired tank or receptacle, and when this tank or receptacle is filled, the container can be set so as to position the nozzle over the other tank or receptacle. The height of the made coffee in the tanks can be readily observed by means of the sight glasses 38. A new batch of coffee is made for each tank or receptacle, so that the made coffee in each tank or receptacle will be of a uniform strength.

As a measured quantity of water can be introduced into the boiler, and a measured quantity of coffee placed in the container, a uniform grade of coffee is assured, without the likelihood of error. If desired, two or more of the containers 40 can be provided, so that one container can always be charged with the ground coffee ready for instant association with the urn. If preferred, after the coffee is made, the valve 41 can be closed, and the container removed and cleaned, and again re-charged with the ground coffee, after which the same can be replaced in its proper position. Obviously, the check valve 47 prevents the downflow of liquid from the container into the boiler.

In conjunction with the boiler 12 I also prefer to utilize a relief pipe 66, and the upper end of this pipe can carry an adjustable relief valve 67. The relief valve 67 can be adjusted so as to control the pressure within the boiler 12, and the set of the valve will control within certain limits the pressure of the water as the same leaves the boiler. The valve 67 is of the vacuum relief type, so as to allow the intake of air as the water is drawn from the boiler. Obviously, other means can be provided for supplying hot water under pressure to the container 40 instead of the boiler 12.

Other changes in details may be made without departing from the spirit or the scope of my invention, but what I claim as new is:

1. In a device for making coffee, a boiler, means for introducing water into the boiler, means for heating the water in the boiler, a pressure pipe leading from said boiler, a container for ground coffee having communication at its lower end with the pressure pipe, a delivery nozzle carried by the upper end of the container, and a disc interposed between the pressure pipe and the container having a small delivering orifice.

2. In a device for making coffee, a closed pressure boiler, means for introducing water into said boiler, means for heating the water in said boiler, a pressure delivery pipe communicating with the boiler, a container for ground coffee, a depending nipple carried by the lower end of the container, a delivery nozzle carried by the upper end of the container, means connecting the nipple with the pressure delivery pipe, a one-way check valve in said nipple for preventing the down flow of liquid from the container into the pipe, and a disc having a restricted orifice disposed between the nipple and the pressure delivery pipe below the check valve.

3. In a coffee-making device, a boiler, means for introducing water into said boiler, means for heating the water in the boiler, a pressure delivery pipe leading from the boiler, a container for ground coffee having a depending nipple, a delivery nozzle carried by the upper end of the container, an externally threaded collar carried by the pressure delivery pipe, a gasket received in said collar, the nipple being received in said collar and engaging the inner face of the gasket, a hand nut threaded on the collar, and a depending annular flange on the hand nut engaging the gasket between the nipple and the collar, as and for the purpose specified.

4. In a beverage producer, a stationary heater, means for controllably admitting fresh liquid to said heater, a hot liquid discharge pipe fixedly attached to said heater and having a socket at its delivery end disposed externally of and remote from the heating chamber, a portable container for granular beverage producing material having a hot liquid inlet nipple communicating therewith beneath the granular material therein and formed for frictional slip attachment to said socket, a non-return check valve confined within said nipple, and a beverage dispensing downspout carried directly by and communicating with said container above the granular material therein.

5. In a beverage producer, a stationary heater, inlet means for controllably admitting fresh liquid to said heater, a hot liquid discharge pipe fixedly attached to said heater and having a socket at its delivery end disposed externally of and remote from the heating chamber, a portable container for granular beverage producing material having a hot liquid inlet nipple communicating therewith beneath the granular material therein and formed for frictional slip attachment to said socket, a non-return check valve confined within said nipple, a beverage dispensing down-spout carried directly by and communicating with said container above the granular material therein, a filter interposed between said spout and the granular material within said container, and a removable closure cover for the top of said container coacting directly with said filter.

AMBROSE A. PETERS.